United States Patent
Hung

(10) Patent No.: US 10,492,521 B2
(45) Date of Patent: Dec. 3, 2019

(54) COMPOSITE INCLUDING COFFEE GROUNDS AND THE METHOD FOR PREPARING THE SAME

(71) Applicant: HOME ACRYLIC INC., New Taipei (TW)

(72) Inventor: Hsiang-Chun Hung, New Taipei (TW)

(73) Assignee: HOME ACRYLIC INC., New Taipei (TW)

( * ) Notice: Subject to any disclaimer, the term of this patent is extended or adjusted under 35 U.S.C. 154(b) by 213 days.

(21) Appl. No.: 15/626,974

(22) Filed: Jun. 19, 2017

(65) Prior Publication Data

US 2018/0249755 A1    Sep. 6, 2018

(30) Foreign Application Priority Data

Mar. 2, 2017    (CN) .......................... 2017 1 0119310

(51) Int. Cl.
*C08L 25/06*    (2006.01)
*A23P 10/20*    (2016.01)
*A23F 5/08*    (2006.01)

(52) U.S. Cl.
CPC ............... *A23P 10/20* (2016.08); *A23F 5/08* (2013.01); *C08L 25/06* (2013.01)

(58) Field of Classification Search
CPC .. C10L 2200/0469; C10L 5/445; C08L 23/12; C08L 25/06; C08L 23/14; C08L 23/06; A23P 10/20
See application file for complete search history.

(56) References Cited

U.S. PATENT DOCUMENTS

2010/0300368 A1* 12/2010 Myers .................. A01K 1/0154
                                                        119/171
2016/0229997 A1*  8/2016 Mohanty ................. C08L 23/12

* cited by examiner

*Primary Examiner* — Hong T Yoo
(74) *Attorney, Agent, or Firm* — WPAT, PC

(57) ABSTRACT

A composite including coffee grounds and the method for preparing the same are disclosed. The method includes drying 20~50 wt % of coffee grounds such that the water content of the coffee grounds is 0.1%~3%, then stirring and mixing the dried coffee grounds with 40~70 wt % of plastic, 5~25 wt % of calcium carbonate and 3~10 wt % of mix modifier, and then performing granulation to form granular composite.

7 Claims, 5 Drawing Sheets

COMPOSITE INCLUDING COFFEE GROUNDS AND THE METHOD FOR PREPARING THE SAME

TECHNICAL FIELD

The disclosure is related to composite including coffee grounds and the method for preparing the same, and more particularly to a component which can treat the waste coffee grounds to granular composite and the method for preparing the same.

RELATED ART

Nowadays, with more and more people drinking coffee on a daily basis the amount of coffee supply has reached 6.6 million tons every year in the world.

However, after coffee powder made by grinding of coffee beans has been used to make coffee, the grounds left behind will not be used again. Normally, coffee grounds would be discarded or used as fertilizer to grow plants. With nearly every convenience stores and restaurants selling coffee, and many families and companies are using coffee machines, the amount of coffee grounds produced every year is considerable and is still increasing.

Thus, the treatment of coffee grounds is very important. If the proportion of recycling and reusing cannot be enhanced, the coffee grounds may significantly burden our environment. Therefore, if coffee grounds can be recycled and reused the consequential impact on the environment may be minimized.

SUMMARY

A composite including coffee grounds is disclosed, and the composition is at least composed of 20~50 wt % of coffee grounds with a water content of 0.1%~3%, 40~70 wt % of plastic, 5~25 wt % of calcium carbonate and 3~10 wt % of mix modifier.

In one embodiment, the plastic is polystyrene bonded with high impact polystyrene, polypropylene or polyethylene.

In one embodiment, the mix modifier includes a coupling agent and a binder, wherein the coupling agent is 1.8~6 wt %, and the binder is 1.2~4 wt %.

A method for preparing the composite including coffee grounds is disclosed. The disclosed method in one embodiment may include drying 20~50 wt % of coffee grounds such that the water content of the coffee grounds is 0.1%~3%, stirring and mixing the dried coffee grounds with 40~70 wt % of plastic, 5~25 wt % of calcium carbonate and 3~10 wt % of mix modifier, granulating the stirred and mixed materials so as to form a granular composite, and then smashing the granular composite to become granular composite for exporting and collecting.

In one embodiment, the coffee grounds may be dried by a drying device such that the water content of the coffee grounds is 0.1%~3%. Such dried coffee grounds may be further delivered to a screening and filtering device for the filtering of unnecessary impurity. The dried coffee grounds, plastic, calcium carbonate and mix modifier are delivered into a high-speed blending device by a feeding device, the dried coffee grounds, plastic, calcium carbonate and mix modifier are stirred and mixed by the high-speed blending device. Over the course of the stirring and mixing process, additional treatments of venting water vapor and heating may be performed by raising the temperature to 160° C., decreasing the water content of the material to 3% because of the venting water vapor and stirring the mixed material using a main granulating device. Thereafter, granular composite may be prepared, which may be further cooled by a discharging and assembling device. The cooled granular composite is smashed to become another granular composite, which may be a finer one, before further collection process could be performed.

In one embodiment, the discharging and assembling device further includes a smashing device, configured for smashing the cooled granular composite to become granular composite.

In one embodiment, the discharging and assembling device further includes a receiving device, configured for collecting the smashed granular composite.

In one embodiment, the granular composite can be formed as a product by a forming device.

In one embodiment, the plastic is polystyrene bonded with high impact polystyrene, polypropylene or polyethylene.

In one embodiment, the mix modifier includes a coupling agent and a binder, wherein the coupling agent is 1.8~6 wt %, and the binder is 1.2~4 wt %.

DETAILED DESCRIPTION

The technical solutions, features and effects of the disclosure can be clearly described in the description of preferred embodiments with reference to the drawings.

Figure 1:
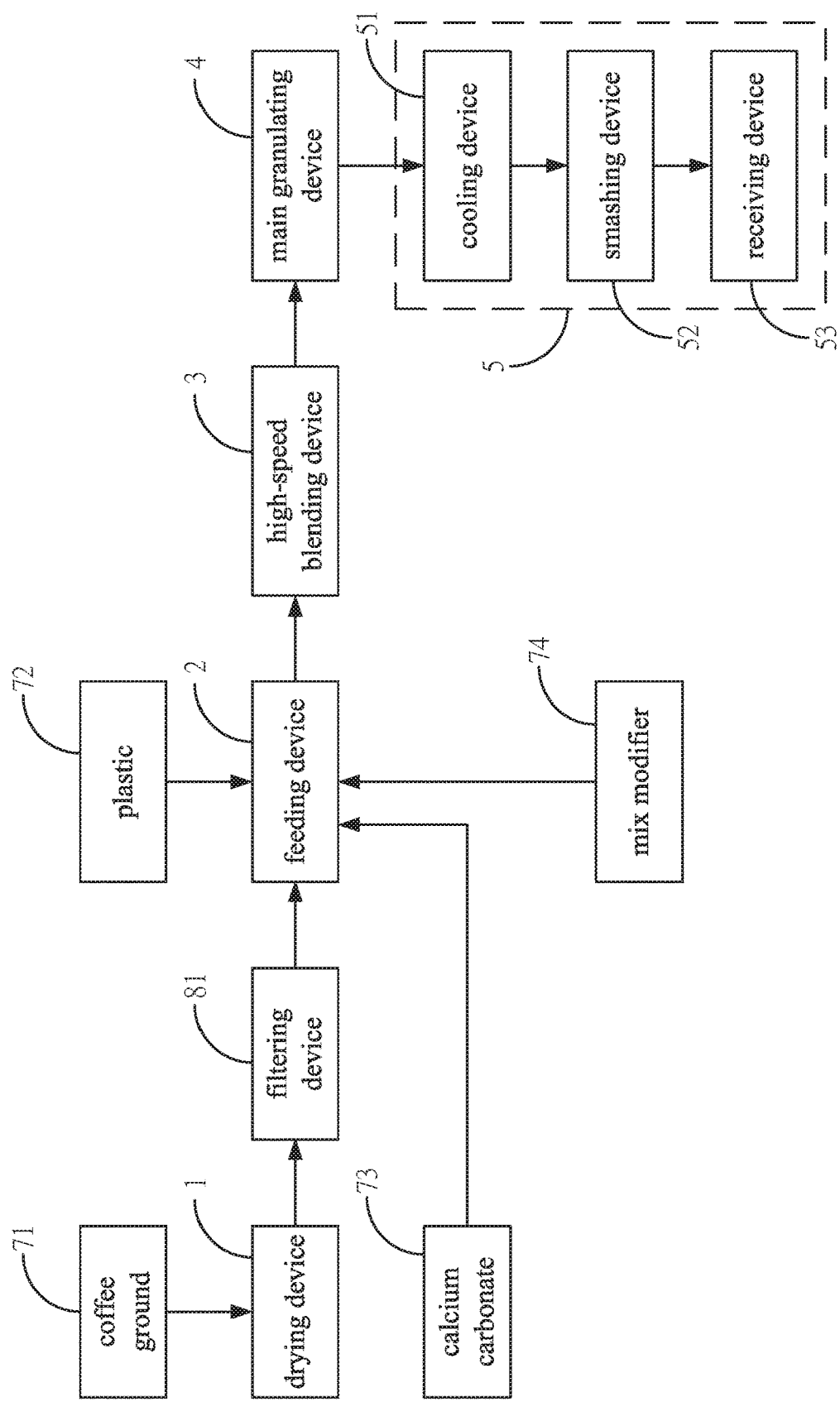
FIG. 1 is a schematic view of the overall implementation structure according to the composite including coffee grounds and the method for preparing the same of the disclosure.

Referring to FIG. 1, which is a schematic view of the overall implementation structure according to the composite including coffee grounds and the method for preparing the same of the disclosure. As shown in the figure, a coffee ground 71 is dried by a drying device 1 such that the water content of the coffee ground could be at 0.1%~3%. Thereafter, the dried coffee ground may be delivered to a screening and filtering device 81 such that unnecessary impurity is filtered. Thus, the dried coffee ground 71, plastic 72, calcium carbonate 73 and mix modifier 73 are delivered into a high-speed blending device 3 by a feeding device 2. The dried coffee ground 71, plastic 72, calcium carbonate 73 and mix modifier 74 may be also stirred and mixed by the high-speed blending device 3.

The coffee ground 71 is 20~50 wt %, and the plastic 72 is polystyrene (PS) bonded with high impact polystyrene (HIPS), polypropylene (PP) or polyethylene (PE). The plastic 72 could be 40~70 wt %. Meanwhile, the calcium carbonate 73 is 5~25 wt %, and the mix modifier 74 is 3~10 wt %. The mix modifier 74 may include a coupling agent and a binder, wherein the coupling agent is 1.8~6 wt %, and the binder is 1.2~4 wt %.

During the stirring and mixing process performed by the high-speed blending device 3, additional treatments of venting water vapor and heating may be performed as well by increasing the temperature to 160° C., and decreasing the water content of the material to 3% because of the venting water vapor.

Afterwards, a main granulating device 4 can be connected with the high-speed blending device 3 so as to stir the mixed material and export the corresponding granular composite, and treat it by a discharging and assembling device 5. The discharging and assembling device 5 may include a cooling device 51, a smashing device 52 and a receiving device 53. The cooling device 51 is configured for cooling the granular composite exported by the main granulating device 4, the smashing device 52 smashes the cooled granular composite to become another granular composite, and the receiving device 53 collects the smashed granular composite.

Figure 2:
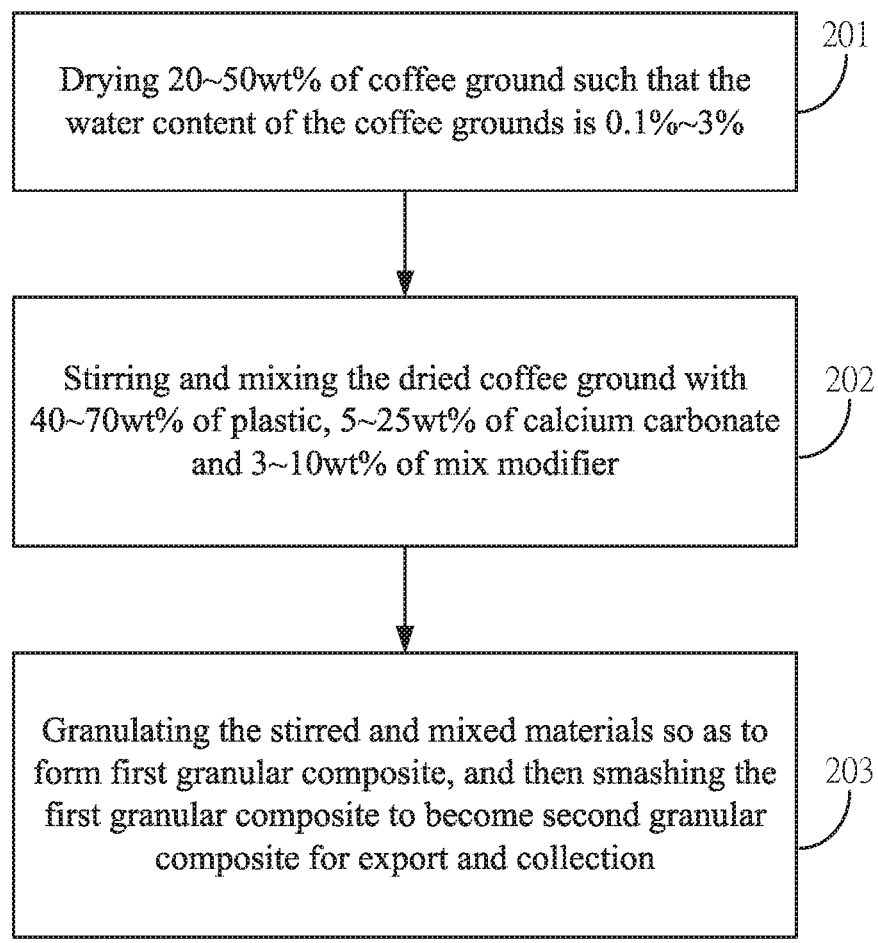
FIG. 2 is a flow chart of the preparation according to the composite including coffee grounds and the method for preparing the same of the disclosure.

FIG. 2 is a flow chart of the preparation according to the composite including coffee grounds and the method for preparing the same of the disclosure. The procedure may include the follows:

(1) drying 20~50 wt % of coffee ground such that the water content of the coffee grounds is 0.1%~3% 201, (2) stirring and mixing the dried coffee ground with 40~70 wt % of plastic, 5~25 wt % of calcium carbonate and 3~10 wt % of mix modifier 202, and (3) granulating the stirred and mixed materials so as to form a granular composite, and then smashing the granular composite to become granular composite for exporting and collecting 203.

Figure 3:
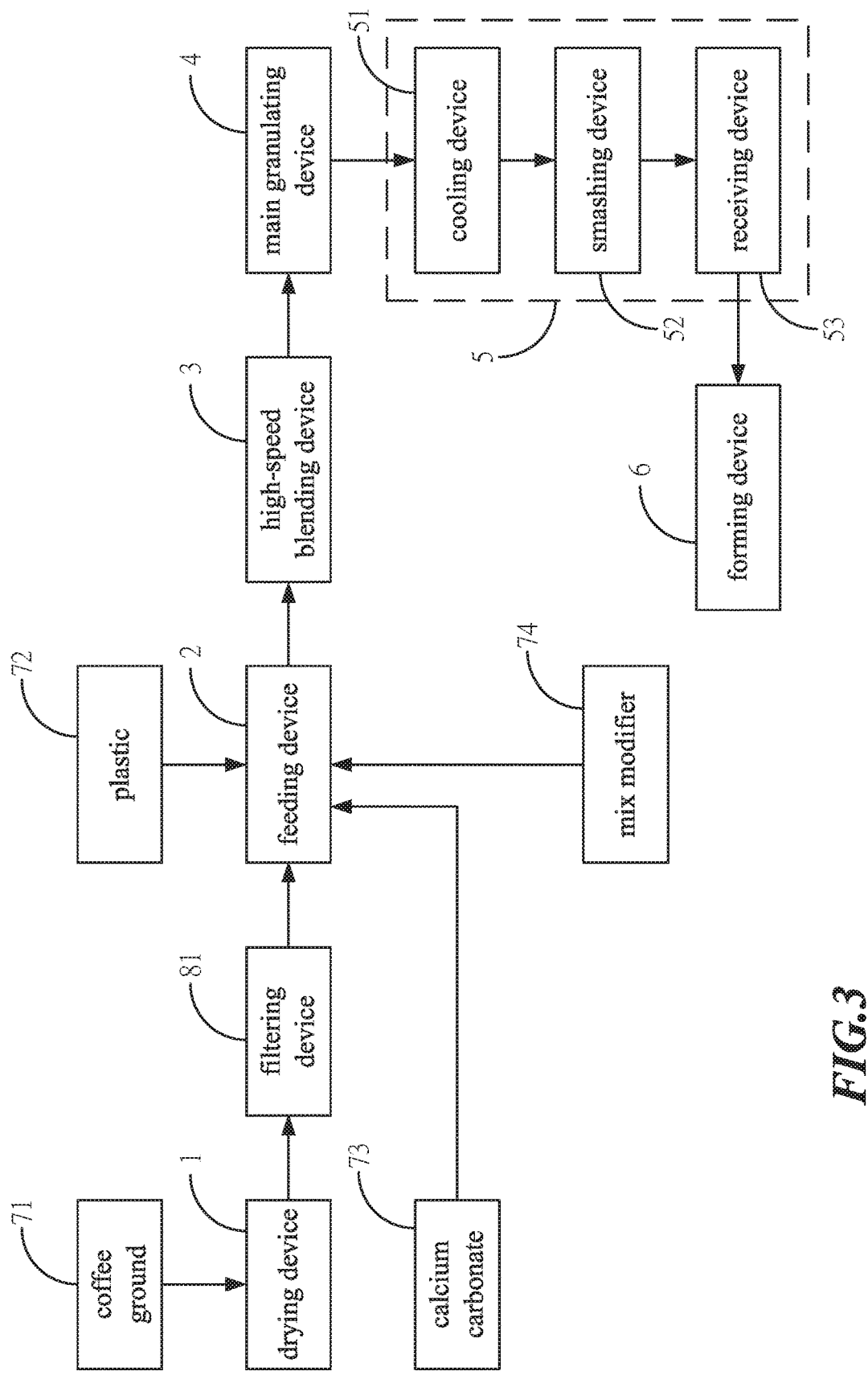
FIG. 3 is a schematic view of the structure including a forming device according to the composite including coffee grounds and the method for preparing the same of the disclosure.
Figure 4:
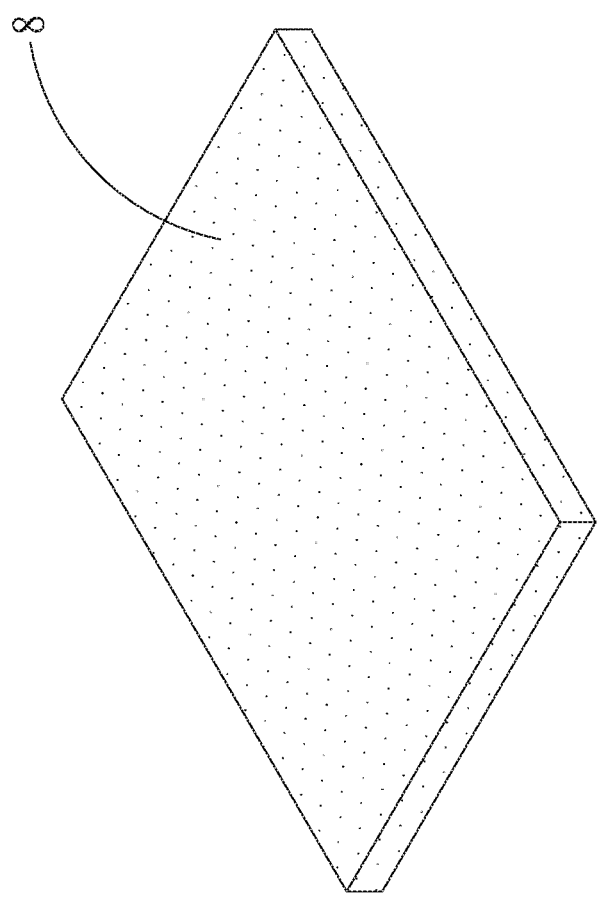
FIG. 4 is a schematic view of the first application according to the composite including coffee grounds and the method for preparing the same of the disclosure.
Figure 5:
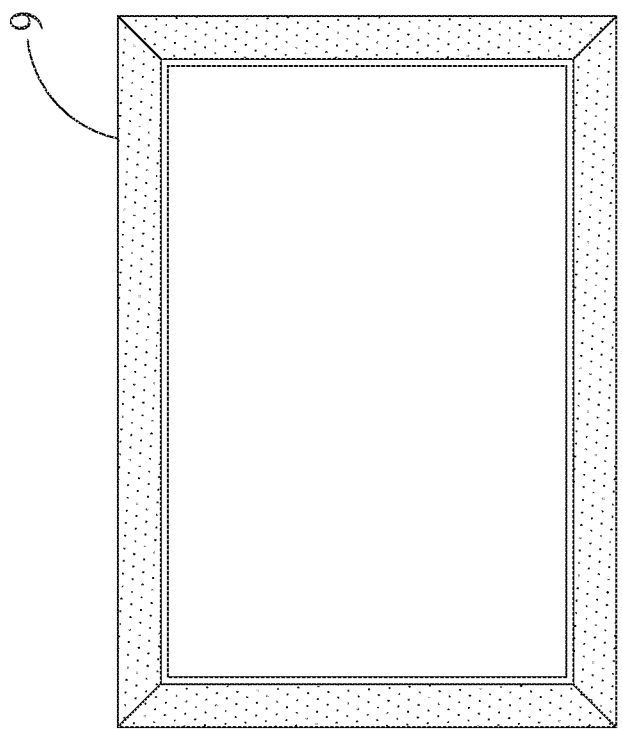
FIG. 5 is a schematic view of the second application according to the composite including coffee grounds and the method for preparing the same of the disclosure.

The weight percentage of the above mentioned coffee ground is: 40 wt %, 45 wt %, 50 wt %, 55 wt %, 60 wt %, 65 wt %, 70 wt %; the weight percentage of the above mentioned calcium carbonate 73 is: 5 wt %, 10 wt %, 15 wt %, 20 wt % or 25 wt %; the weight percentage of the above mentioned mix modifier 74 is: 3 wt %, 4 wt %, 5 wt %, 6 wt %, 7 wt %, 8 wt %, 9 wt % or 10 wt %; the weight percentage of the above mentioned coupling agent is: 1.8 wt %, 2 wt %, 3 wt %, 4 wt %, 5 wt % or 6 wt %; the weight percentage of the above mentioned binder is: 1.2 wt %, 2 wt %, 3 wt % or 4 wt %;

As shown in FIG. 3, the granular composite can be formed as a product by a forming device 6. As shown in FIG. 4, the granular composite can be compressed and cut as a substrate 8, and alternatively, as shown in FIG. 5, it can be compressed and cut as a frame 9. In addition, besides the formation by compressing and cutting, a product can also be formed by injection molding.

According to the composite including the coffee grounds and the method for preparing the same of the disclosure, as compared to traditional technologies, the disclosed has the following advantages:

(1) The disclosure can recycle and reuse the coffee grounds, such that coffee grounds are more industrially applicable and the problem in connection with the post-treatment of coffee grounds can be avoided.

(2) After the recycled coffee grounds are formed to granular composite, they can be formed to different products, such that the formed product could be more environmental friendly, in addition, since the raw materials include the coffee grounds, the formed product is light brown with a slight fragrance of coffee, which may function as deodorant.

Note that the specifications relating to the above embodiments should be construed as exemplary rather than as limitative of the present disclosure. The equivalent variations and modifications on the structures or the process by reference to the specification and the drawings of the disclosure, or application to the other relevant technology fields directly or indirectly should be construed similarly as falling within the protection scope of the disclosure.

What is claimed is:

1. A method for preparing composite including coffee grounds comprises:
   1) drying the coffee grounds such that a water content of the coffee grounds is 0.1%~3% and the dried coffee grounds is 20~50 wt % of the composite;
   2) stirring and mixing the dried coffee grounds with 40~70 wt % of plastic, 5~25 wt % of calcium carbonate and 3~10 wt % of mix modifier; and
   3) granulating the stirred and mixed materials so as to form a first granular composite, and then smashing the first granular composite to become a second granular composite for export and collection.

2. The method for preparing composite including coffee grounds according to claim 1,
   wherein the coffee grounds is dried by a drying device in step 1);
   wherein the dried coffee grounds is delivered to a screening and filtering device after step 1);
   wherein the stirring and mixing in step 2) is performed in a high-speed blending device, wherein additional treatments of venting water vapor is performed by increasing the temperature of the stirred and mixed material to 160° C. and decreasing the water content of the stirred and mixed material to 3%; and
   wherein the first granular composite is cooled by a discharging and assembling device, the cooled granular composite is smashed to become the second granular composite in step 3).

3. The method for preparing composite including coffee grounds according to claim 1, wherein the discharging and assembling device further comprises a smashing device, configured for smashing the cooled first granular composite to become the second granular composite.

4. The method for preparing composite including coffee grounds according to claim 1, wherein the discharging and assembling device further comprises a receiving device, configured for collecting the smashed second granular composite.

5. The method for preparing composite including coffee grounds according to claim 1, wherein the second granular composite is a product by a forming device.

6. The method for preparing composite including coffee grounds according to claim 1, wherein the plastic is polystyrene bonded with high impact polystyrene, polypropylene or polyethylene.

7. The method for preparing composite including coffee grounds according to claim 1, wherein the mix modifier comprises a coupling agent and a binder, wherein the coupling agent is 1.8~6 wt % of the composite, and the binder is 1.2~4 wt % of the composite.

* * * * *